(12) United States Patent
Kimura et al.

(10) Patent No.: US 6,450,533 B1
(45) Date of Patent: Sep. 17, 2002

(54) STEERING COLUMN HANGER BEAM STRUCTURE

(75) Inventors: Itsuo Kimura; Syuichiro Iwatsuki; Tatsuo Kasuga, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/645,528

(22) Filed: Aug. 25, 2000

(30) Foreign Application Priority Data

Aug. 26, 1999 (JP) .......................................... 11-240534

(51) Int. Cl.$^7$ .............................. B62D 1/16; B62D 25/14
(52) U.S. Cl. ............................. 280/779; 180/90; 296/72
(58) Field of Search ................................ 280/779, 752, 280/750, 775, 776; 180/90; 296/70, 72, 71

(56) References Cited

U.S. PATENT DOCUMENTS

| | | | | |
|---|---|---|---|---|
| 4,000,876 A | * | 1/1977 | Usui et al. ............... | 280/779 X |
| 4,432,565 A | | 2/1984 | Suzuki et al. .............. | 280/779 |
| 4,671,536 A | | 6/1987 | Yoshimura .................. | 380/779 |
| 5,052,240 A | * | 10/1991 | Miyoshi et al. ............ | 280/779 |
| 5,117,707 A | * | 6/1992 | Kinoshita et al. ........... | 280/775 |
| 5,806,916 A | * | 9/1998 | Sinner et al. ................ | 280/779 |
| 5,868,426 A | * | 2/1999 | Edwards et al. ............ | 280/779 |
| 5,934,733 A | * | 8/1999 | Manwaring ................. | 280/779 |
| 5,944,348 A | * | 8/1999 | Boyle, III et al. .......... | 280/777 |
| 6,027,088 A | * | 2/2000 | Stedman et al. ........ | 280/779 X |
| 6,237,956 B1 | * | 5/2001 | Haba et al. ................. | 280/777 |
| 6,250,678 B1 | * | 6/2001 | Yoshinaka et al. .......... | 280/752 |

FOREIGN PATENT DOCUMENTS

| | | |
|---|---|---|
| DE | 0 896 919 A2 | 2/1999 |
| JP | 07-85991 | 9/1995 |
| JP | 8-183478 | 7/1996 |
| JP | 198 45 146 A1 | 4/2000 |
| WO | WO 00/17031 | 3/2000 |
| WO | WO 00/17034 | 3/2000 |

* cited by examiner

Primary Examiner—Paul N. Dickson
Assistant Examiner—Toan C. To
(74) Attorney, Agent, or Firm—Armstrong, Westerman & Hattori, LLP (57) ABSTRACT

A steering column hanger beam 21 extended between left and right front pillars 13, 15 for supporting a steering column 65 is constructed as an in-line connected body comprising a driver's side hanger beam 22 having a large diameter cross-section and a front passenger's side hanger beam 60 having a small diameter cross-section.

6 Claims, 8 Drawing Sheets

STEERING COLUMN HANGER BEAM STRUCTURE

BACKGROUND OF THE INVENTION

1. Field of the Invention

The present invention relates to a steering column hanger beam for supporting a steering column for steering a vehicle.

2. Description of the Related Art

Vehicle such as automotive vehicles comprise a steering column hanger beam for supporting a steering column for steering. As to the steering column hanger beam, for example, Japanese Patent Examined Publication No. Hei. 7-85991 proposes a "steering column support member mounting structure."

In this technique, a steering column support member (hereinafter, referred to as a "steering column hanger beam") is extended transversely of the vehicle body, whereby the steering column is supported by this steering column hanger beam.

Since the steering column hanger beam is a member formed of a steel material, the rigidity can be maintained even if the beam is reduced to a relatively small diameter. Accordingly, since a relatively wide space can be secured with such a reduced-diameter beam, an accessory to the vehicle body such as an air conditioner can be disposed in this space.

In order to suppress the fuel consumption of an engine, however, the weight of the vehicle body needs to be reduced. In order to have a lighter vehicle weight, the vehicle body may be formed of a light material such as aluminum alloy.

Aluminum alloy provides a lower tensile strength when compared with steel, and therefore, in a case where the steering column hanger beam is produced of aluminum alloy, the diameter of such a steering column hanger beam has to be increased when compared with a steel steering column hanger beam in order to secure a required rigidity for the steering column hanger beam.

However, increasing the diameter of the steering column hanger beam makes it difficult to reduce the vehicle weight.

In addition, increasing the diameter of the steering column hanger beam then reduces the space in the vicinity thereof, and this may cause a risk of little space for placement of an accessory to the vehicle body such as an air conditioner being secured.

SUMMARY OF THE INVENTION

To this end, an object of the invention is to provide a technique with which not only the steering column hanger beam can be made lighter but also enough space can be secured for placement of an accessory to the vehicle body such as an air conditioner.

With a view to attaining the above object, according to a first aspect of the invention, there is provided a steering column hanger beam structure wherein a steering column hanger beam extended between left and right front pillars for supporting a steering column is constructed by an in-line connected body comprising in turn a driver's side hanger beam having a large diameter cross-section and a front passenger's side hanger beam having a small diameter cross-section.

The steering column hanger beam is provided which is the in-line connected body comprising the driver's side hanger beam and the front passenger's side hanger beam. Due to this, the driver's side hanger beam which needs to provide a higher rigidity can be provided with the large diameter cross-section, whereas the front passenger's side hanger beam which does not need to provide a relatively high rigidity can be provided with the small diameter cross-section.

Consequently, while the rigidity required for the steering column hanger beam is secured, the weight of the steering column hanger beam can be reduced.

In addition, the small diameter cross-section of the front passenger's side hanger beam allows the relatively wide space to be secured in the vicinity of the hanger beam.

According to a second aspect of the invention, there is provided a steering column hanger beam structure, wherein the driver's side hanger beam comprises a flange disposed at one end of a beam main body for abutment with one of the front pillars and support brackets disposed on a side of the beam main body for supporting the steering column, and wherein the beam main body, the flange and the support brackets are manufactured from extruded profiles.

The constituent components of the driver's side hanger beam are manufactured of the extruded profiles. This allows the constituent components of the driver's side hanger beam can be formed in a continuous fashion, respectively, and therefore, the production efficiency thereof can be improved.

According to a third aspect of the invention, there is provided a steering column hanger beam structure, wherein the beam main body is a long member having a rectangular cross-section.

The beam main body is formed so as to have the rectangular cross-section. The flange and the support brackets can be mounted at the proper position on the beam main body with ease by making use of corners of the rectangular cross-section. Consequently, the driver's side hanger beam can be assembled with a relatively short period of time.

DETAILED DESCRIPTION OF THE PREFERRED EMBODIMENTS

An embodiment of the invention will be described below with reference to the accompanying drawings. Note that "front," "rear," "left," "right," "top," and "bottom" denote directions as viewed from the driver. In addition, the drawings are to be seen as oriented by reference numerals.

Figure 1:
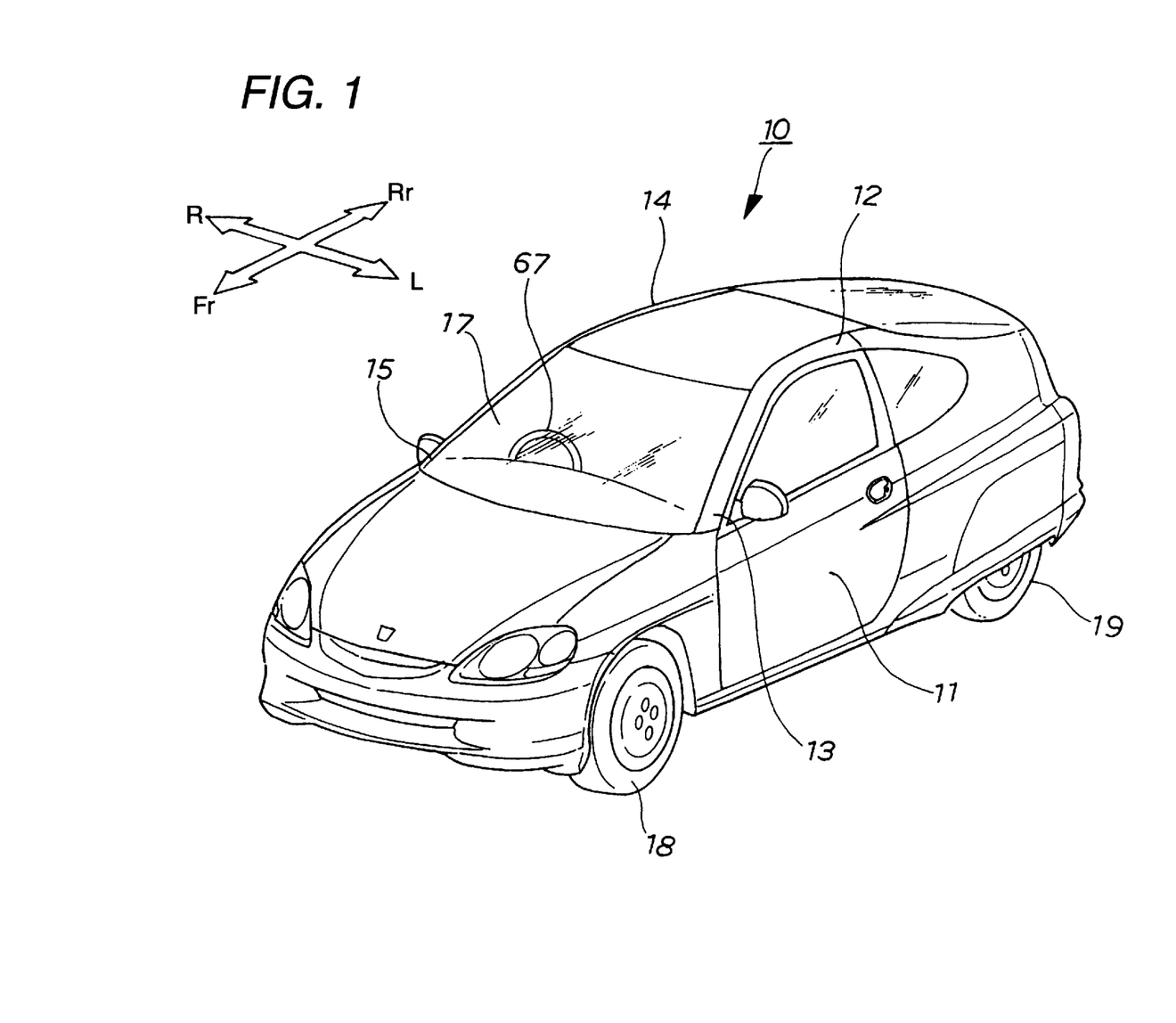
FIG. 1 is a perspective view of a vehicle to which a steering column hanger beam structure according to the invention is attached.

FIG. 1 is a perspective view of a vehicle to which a steering column hanger beam according to the invention is attached.

In a vehicle 10, left and right doors 11 (only the right door is shown) are attached to left and right side members 12, 14, respectively, and a steering column hanger beam structure (which will be described later) is mounted between a left-hand side front pillar 13 constituting the left side member 12 and a right-hand side front pillar 15 constituting the right side member 14.

This steering column hanger beam structure is, for example, intended to support the steering wheel 67. Note that reference numeral 17 is a windscreen, and reference numerals 18, 19 denote, respectively, a front wheel and a rear wheel 19.

Figure 2:
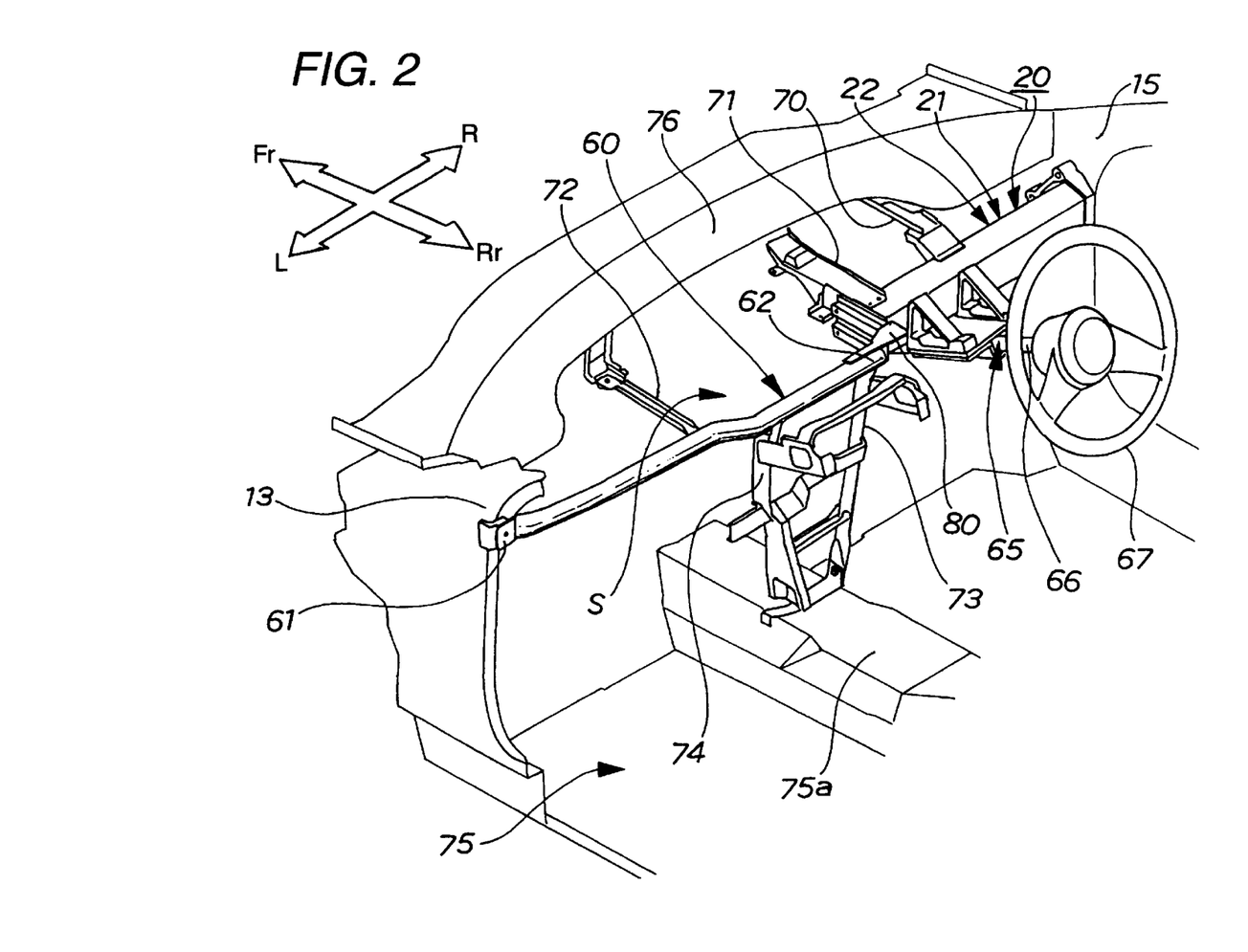
FIG. 2 is a perspective view of the steering column hanger beam structure according to the invention.

FIG. 2 is a perspective view of a steering column according to the invention.

In this steering column hanger beam structure 20, a steering column hanger beam 21 comprises a driver's side hanger beam 22 having a large diameter cross-section and a front passenger's side hanger beam 60 having a small diameter cross-section, these hanger beams 22, 60 are connected in-line via a connecting member 80 so as to be extended between the left and right front pillars 13, 15, and the steering column 65 is then supported by the driver's side hanger beam 22.

In the steering column hanger beam structure 20, the driver's side hanger beam 22 is supported by a first stay 70, and a second stay 7, a connected portion between the driver's side hanger beam 22 and the front passenger's side hanger beam 60 are supported by a right center stay 73, and the front passenger's side hanger beam 60 is supported by a left center stay 74 and a third stay 72.

The left-hand side front pillar 13 is a member mounted on the left-hand side of a floor plate 75, whereas the right-hand side front pillar 15 is a member mounted on the right-hand side of the floor plate 75.

The front passenger's side hanger beam 60 is a member which is formed of an aluminum alloy pipe having a small diameter cross-section and is offset to the rear of the vehicle from the center of the driver's side hanger beam 22. Furthermore, the front passenger's side hanger beam 60 is bolted to the left-hand side front pillar 13 at a left end and is connected to a left end of the driver's side hanger beam 22 at a right end 62 thereof.

Note that the front passenger's side hanger beam 60 is disposed on the front passenger side.

The steering column 65 incorporates therein a steering shaft 66, and the steering wheel 67 is mounted on the top of the steering shaft 66.

The first to third stays 70 to 72 are members extending to the rear substantially horizontally from a cowl top 76 of the vehicle body. In addition, the left and right center stays 73, 74 are mounted on a front tunnel 75a substantially vertically.

As has been described above, the steering column hanger beam structure 20 Is constructed as the in-line connected body of the driver's side hanger beam 22 and the front passenger's side hanger beam 60. This allows the driver's side hanger beam 22 requiring a high rigidity to have a large diameter cross-section, whereas the front passenger's side hanger beam 60 requiring no relatively high rigidity is allowed to have only a small diameter cross-section. Accordingly, the weight of the steering column hanger beam structure 20 can be reduced with the rigidity thereof being secured.

Moreover, a space S secured between the front passenger's side hanger beam 60 and the cowl top 76 of the vehicle body can be enlarged by allowing the front passenger's side hanger beam 60 to have the small diameter cross-section and also allowing the front passenger's side hanger beam 60 to be offset to the rear of the vehicle body from the center of the driver's side hanger beam 22. This allows an accessory for the vehicle body such as an air conditioner (not shown) to be disposed in the space S.

Figure 3:
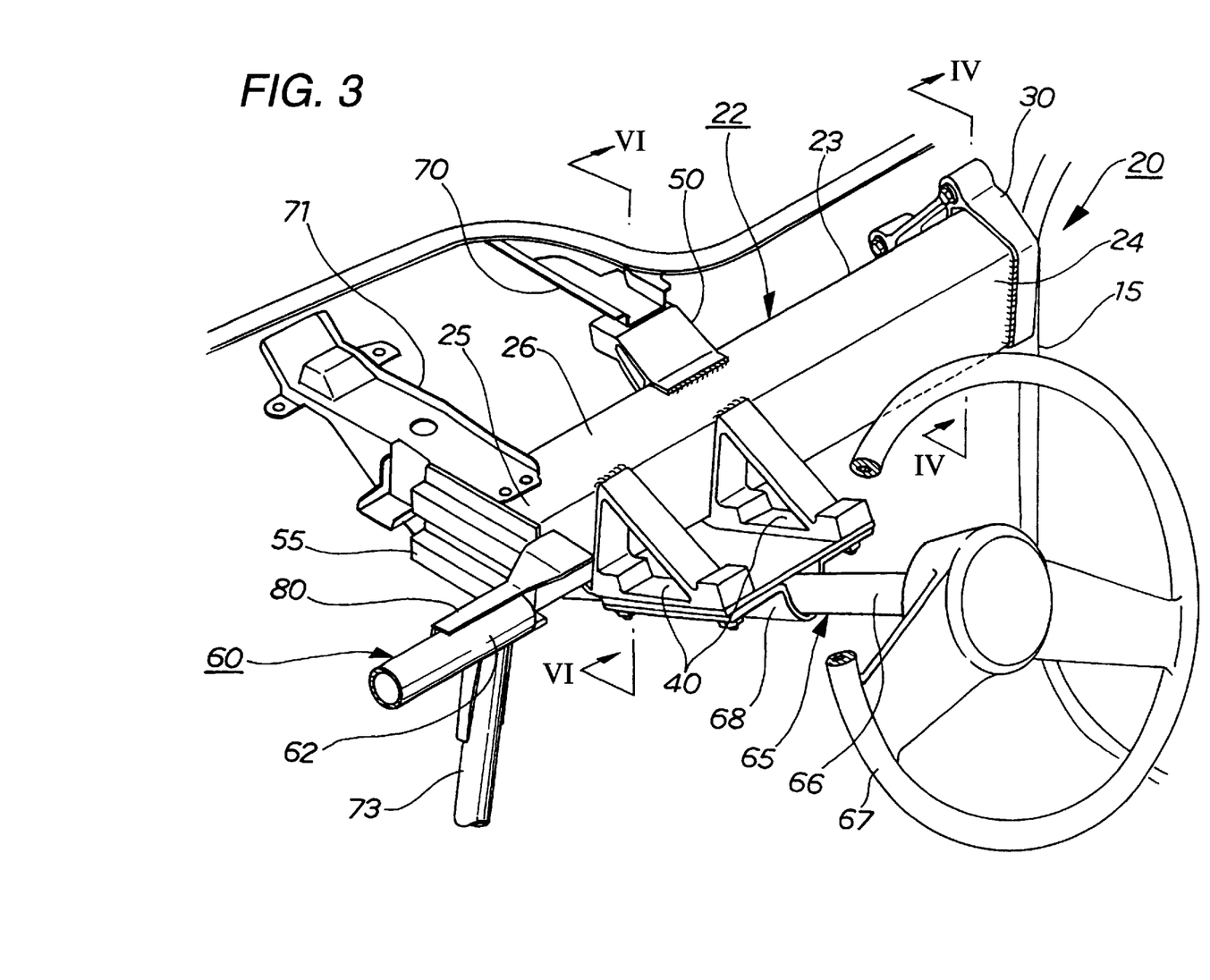
FIG. 3 is a perspective view of the steering column hanger beam structure according to the invention.

FIG. 3 is a perspective view of the steering column hanger beam structure according to the invention.

The driver's side hanger beam 22 is provided with a flange (a right flange) 30 fitted on a beam main body 23 at one end (a right end) 24 thereof, support brackets 40, 40 attached to one side (a peripheral wall) 26 of the beam main body 23 at a certain interval, a fixing bracket 50 attached to another peripheral wall 26 opposite to the side of the support brackets 40, 40 are attached, and a left flange 55 attached to a left end 25 of the beam main body 23.

This driver's side hanger beam 22 is attached to one of the front pillars (the right-hand side front pillar ) 15 by the right flange 30 and is connected to the right end 62 of the front passenger's hanger beam 60 via the connecting member 80 by the left flange 55.

Note that the driver's side hanger beam 22 is disposed on the driver's seat side.

Figure 4:
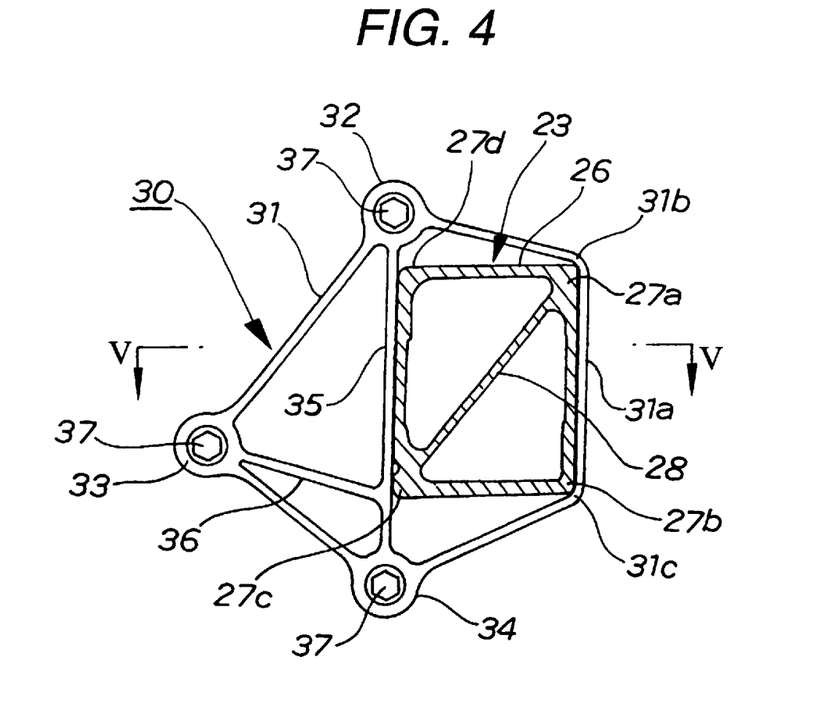
FIG. 4 is a cross-sectional view taken along the line IV—IV of FIG. 3.

FIG. 4 is a cross-sectional view taken along the line IV—IV of FIG. 3.

The beam main body 23 is a long member formed of aluminum alloy and having a rectangular cross-section, which has the peripheral walls 26 each formed into a rectangular. A reinforcement rib 28 is provided in the beam main body 23 so as to connect a corner portion 27a to another corner portion 27b which confronts each other diagonally. This beam main body 23 is a member cut to a predetermined length from an extruded profile. This allows the beam main body 23 to be produced continuously to thereby improve the production efficiency.

The right flange 30 is a member of aluminum alloy which has peripheral walls 31 formed into substantially a pentagon. First to third bosses (hereinafter, the first boss is denoted by 32, the second boss by 33 and the third boss by 34) are formed at first to third top portions 32 to 34. The first boss 32 is connected to the third boss 34 via a first rib 35. The first rib 35 is connected to the second boss 33 by a second rib 36. The beam main body 23 is inserted between a right wall 31a of the peripheral wall 31 and the first rib 35. The beam main body 23 is attached to the right-hand side front pillar 15 (FIG. 1) with bolts 37 . . . which are inserted into the first to third bosses 32 to 34.

The right flange 30 can be attached accurately to a predetermined position relative to the beam main body 23 by aligning the right-hand side top corner portion 27a and the right-hand side bottom corner portion 27b with top and bottom corners 31b, 31c of the right wall 31a. This facilitates the attachment of the right flange 30 to the beam main body 23.

Note that the right flange is a member cut to a predetermined length from an extruded profile. Since this allows the right flange 30 to be produced continuously, the production efficiency thereof can be improved.

Figure 5:
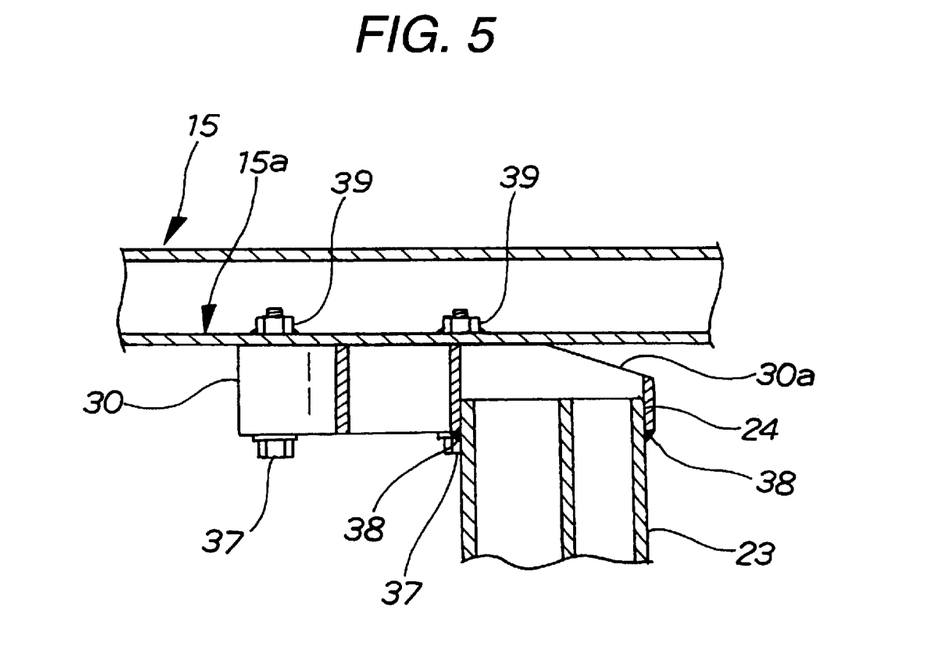
FIG. 5 is a cross-sectional view taken along the line V—V of FIG. 4.

FIG. 5 is a cross-sectional view taken along the line V—V of FIG. 4.

The cross-sectional view shows a state in which the right flange 30 is attached to an inner panel 15a of the right-hand side front pillar 15 by fitting the right flange 30 on the right end 24 of the beam main body 24 for welding together, and tightening the bolts 37 . . . with nuts 39 . . . Reference numeral 38 denotes a welded portion.

Since a slope 30*a* is formed on the right flange 30, a gap can be provided between the right flange 30 and the inner panel 15*a*. Thus, an accessory component to the vehicle body such as an instrument panel or the like (not shown) can be mounted by making use of the gap so provided.

Figure 6:
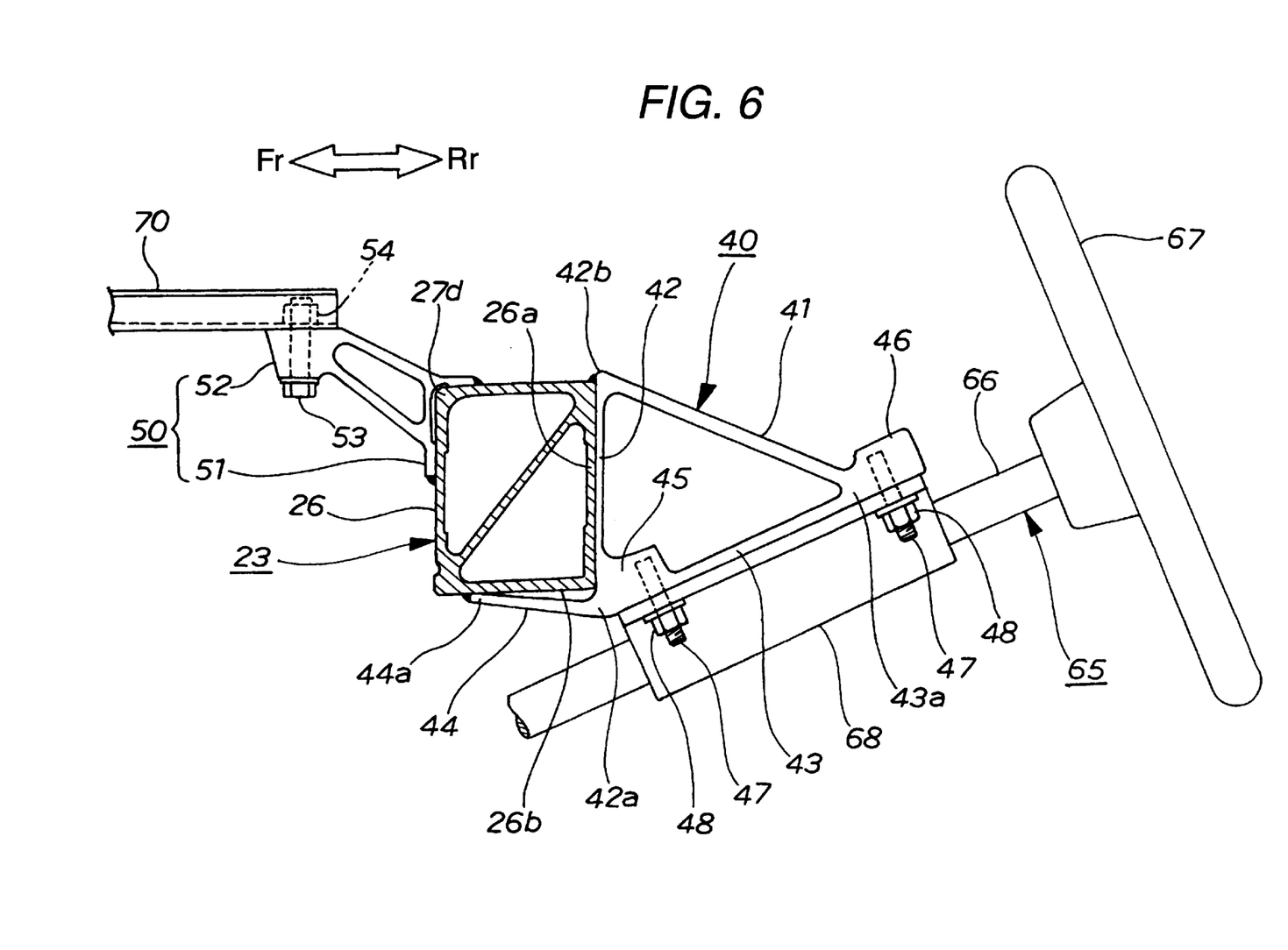
FIG. 6 is a cross-sectional view taken along the line VI—VI of FIG. 3.

FIG. 6 is a cross-sectional view taken along the line VI—VI of FIG. 3.

The support bracket 40 is an aluminum alloy member constituted by peripheral walls 41 which are formed into substantially a triangular shape. A front wall 42 of the peripheral walls 41 is brought into contact with a rear wall 26*a* of the beam main body 23. Then, a plate 44 extends from a lower end 42*a* of the front wall 42 along a lower wall 26*b* of the beam main body 23. An upper end 42*b* of the front wall 42 and a front end 44*a* of the plate 44 are welded to the peripheral walls 26*a* of the beam main body 23.

This support bracket 40 is a member for supporting the steering column 65. A thicker portion 45 is formed at the lower end portion 42*a* of the front wall 42, and a thicker portion 46 is formed at a rear end 43*a* of a bottom wall 43. Stud bolts 47, . . . are attached to the thicker portions 45, 46 and are tightened by nuts 48, . . . , so that the support bracket 40 is attached to a support plate 68 for supporting the steering column 65.

The support bracket 40 can be accurately disposed at a predetermined position by making use of the corners of the beam main body 23 by applying the front wall 42 to the rear wall 26*a* of the beam main body 23 and also applying the front end 44*a* of the plate 44 to the bottom wall 26*a* of the beam main body 23. This facilitates the attachment of the support bracket 40 to the beam main body 23.

Note that the support bracket 40 is a member cut to a predetermined length from an extruded profile. This allows the support bracket 40 to be molded continuously, to thereby improve the production efficiency thereof.

The fixing bracket 50 is an aluminum alloy member comprising a beam side attachment portion 51 for attaching to the beam main body 23 and a main body side attachment portion 52 formed on an opposite side to the attachment portion 51 for attaching to the first stay 70.

The beam side attachment portion 51 attaches to the top front corner portion 27*d* of the beam main body 23 at a substantially right angle concave surface thereof and is then welded to the peripheral wall 26 of the beam main body 23. In addition, the main body side attachment portion 52 is a member attached to the first stay 70 with bolts 53 and nuts 54.

The fixing bracket 50 can accurately be disposed at a predetermined position relative to the beam main body by applying the beam side attachment portion 51 to the top front corner 27*d* of the beam main body 23. This allows the fixing bracket 50 to be simply attached to the beam main body 23.

The fixing bracket 50 is a member cut to a predetermined length from an extruded profile. This allows the fixing bracket 50 to be molded in a continuous fashion to thereby improve the production efficiency thereof.

Figure 7:
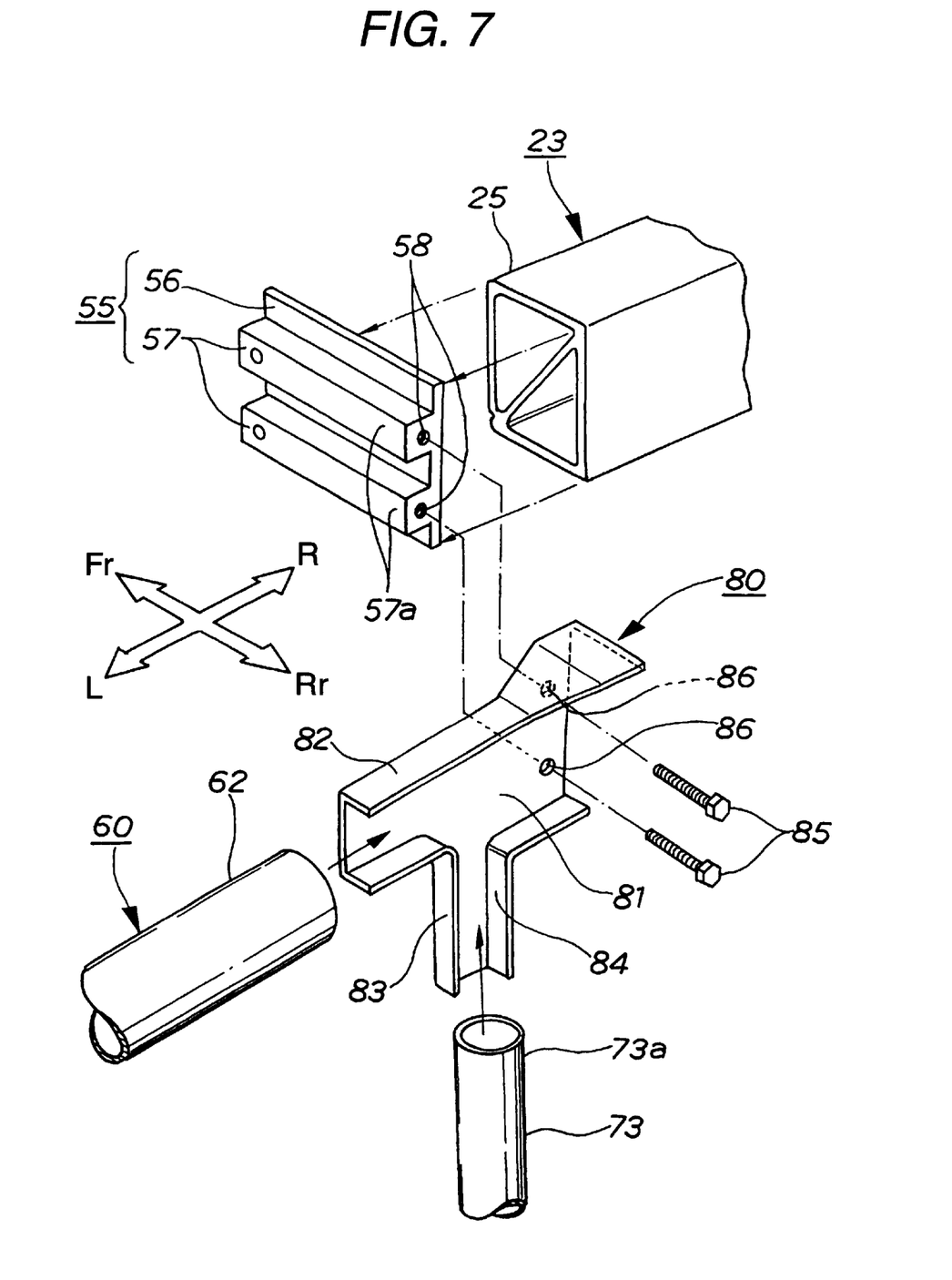
FIG. 7 is a perspective view showing a main part of the steering column hanger beam according to the invention.

FIG. 7 is a perspective view showing a main part of the steering column hanger beam structure according to the invention.

The left flange 55 is an aluminum alloy member in which two protruding elongate portions 57, 57 are formed in parallel with each other on a rectangular plate 56, internal threads 58, 58 being formed in rear ends 57*a*, 57*a* of the protruding elongate portions 57, 57, the back side thereof being welded to the left end 25 of the beam main body 23.

This left flange 55 is a member cut to a predetermined length from an extruded profile. This allows the left flange 55 to be molded in a continuous fashion to thereby improve the production efficiency thereof.

The connecting member 80 is an aluminum alloy member formed substantially into a T-shape. An upper bent piece 82 is formed at an upper end of a plate 81 of the member, a left-hand side piece 83 is formed on the left-hand side thereof, and a right-hand side bent piece 84 is formed or the right-hand side thereof. Holes 86, 86 are formed at a right end of the plate 81 at a predetermined interval for insertion of bolts 85, 85.

The connecting member 80 is a member for connecting the front passenger's side hanger beam 60 and the right center stay 73 to the left flange 55. The right end 62 of the front passenger's side hanger beam 60 is inserted between the upper bent piece 82 and the left-hand side bent piece 83 for welding. An upper end 73*a* of the right center stay 73 is inserted between the left-hand side bent piece 83 and the right-hand side bent piece 84 for welding. The bolts 85, 85 are inserted into the holes 86, 86, and the bolts 85, 85 are screw-connected into the female threads 58, 58 formed in the left flange 55.

Next, a production process of the steering column hanger beam structure according to the invention will be described.

Figure 8A:
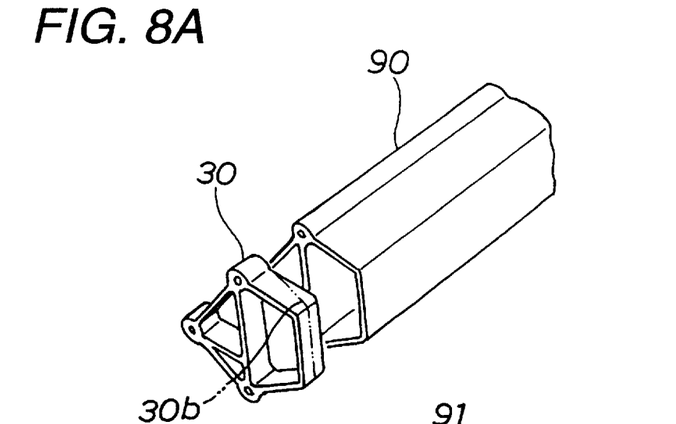
FIGS. 8A to 8C are explanatory views showing a first production process of the steering column hanger beam according to the invention.
Figure 8B:
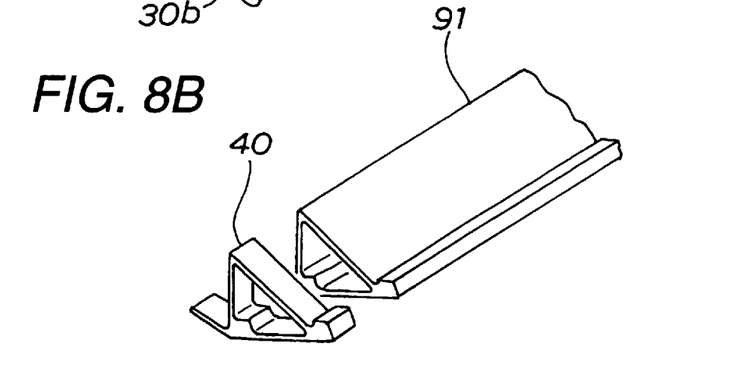

FIGS. 8A and 8B are explanatory views explaining a first production process of the steering column hanger beam structure according to the invention.

In FIG. 8A, an extruded profile 90 is extruded so as to have the same cross-section as that of the right flange 30, and hereafter, the extruded profile 90 is then cut to a predetermined length. Next, the extruded profile so cut is then cut along a cutting line 30*b* indicated by an imaginary line 30*b* to thereby form a slope 30*a* (shown in FIG. 5), whereby the right flange 30 is obtained.

In FIG. 8B, an extruded profile 91 is extruded so as to have the same cross-section as that of the support bracket 40, and thereafter, the extruded profile 91 is then cut to a predetermined width, whereby the right flange 30 is obtained.

Note that the beam main body 23 and the left flange 55 are also produced by being extruded as in the case with the right flange 30 and the support bracket 40 and then cut to predetermined lengths.

Thus, the respective constituent components (the beam main body 23, right flange 30, support bracket 40 and left flange 55) of the driver's side hanger beam 22 are produced from the extruded molding. Since the respective constituent components of the driver's side hanger beam 22 can be produced in continuous fashions, the production efficiency of the respective components can be improved.

Figure 8C:
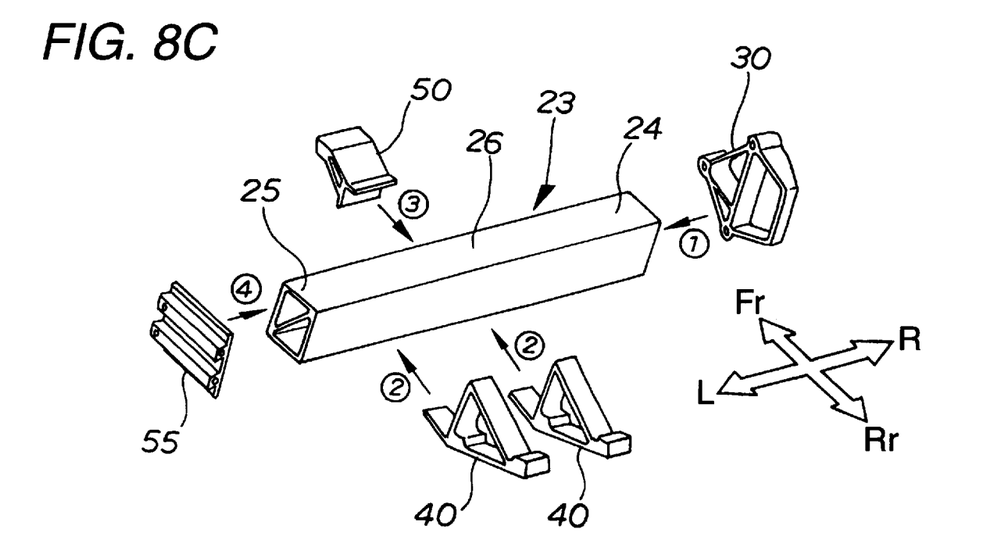

In FIG. 8C, the right flange 30 is inserted on the right end 24 of the beam main body 23 as indicated by an arrow $\hat{1}$ for welding. Next, the support brackets 40, 40 are applied to the peripheral wall 26 of the beam main body 23 as indicated by arrows $\hat{2}, \hat{2}$ for welding. Following this, the fixing bracket 50 is applied as indicated by an arrow $\hat{3}$ to the peripheral wall 26 opposite to the side where the support brackets 40, 40 are welded for welding. Following this, the left flange 55 is applied to the left end 25 of the beam main body 23 as indicated by an arrow $\hat{4}$ for welding, this completing the driver's side hanger beam 22 shown in FIG. 3.

Figure 9:
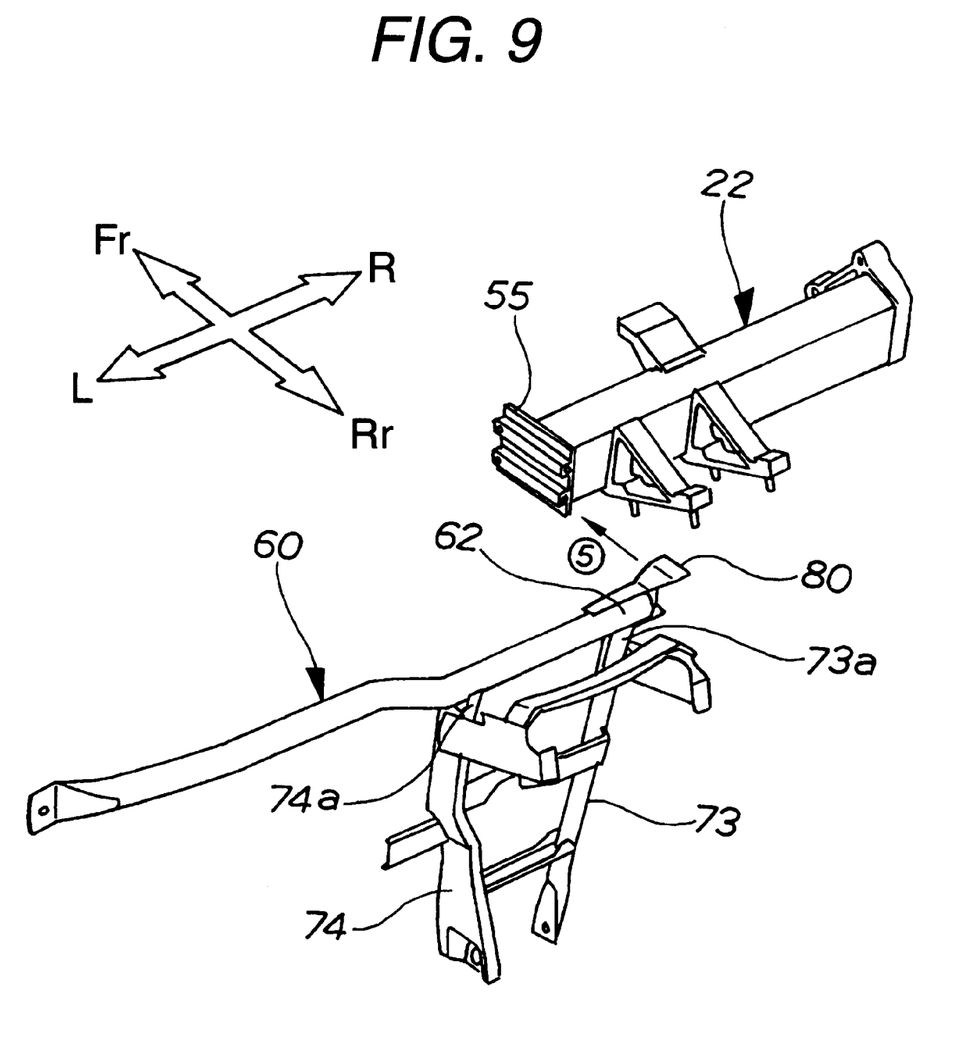
FIG. 9 is an explanatory view showing a second production process of the steering column hanger beam according to the invention.

FIG. 9 is an explanatory view explaining a second production process of a steering column hanger beam structure according to the invention.

The connecting member 80 is attached to the right end 62 of the front passenger's side hanger beam 60, the upper end 73a of the right center stay 73 is attached to the connecting member 80, an upper end 74a of the left center stay 74 is attached to substantially the center of the front passenger's side hanger beam 60, and the connecting member 80 is applied to the rear end of the left flange 55 as indicated by an arrow 5, whereby the connecting member 80 is bolted to the left flange 55. This obtains the steering column hanger beam structure 20 (shown in FIG. 2) in which the driver's side hanger beam 22 and the front passenger's side hanger beam 60 are connected to each other in-line.

Note that in the above embodiments, the steering column hanger beam structure 20 is described as being produced of aluminum alloy, the structure may be produced of, for example, aluminum or steel material.

In addition, in the embodiments, while the front passenger's side hanger beam 60 is described as being offset to the rear of the vehicle from the center of the driver's side hanger beam 22, the amount of offset may be set optionally.

Furthermore, in the above embodiments, while the driver's side hanger beam 22 is described as having a rectangular cross-section, any cross-sectional configuration may be used.

In addition, while the driver's side hanger beam 22 is described as being disposed on the right-hand side of the vehicle and the front passenger's side hanger beam 60 is described as being disposed on the left-hand side of the vehicle, the invention is not limited to those, and the driver's side hanger beam 22 may be disposed on the left-hand side of the vehicle, whereas the front passenger's side hanger beam 60 may be disposed on the right-hand side of the vehicle.

The invention exhibits the following advantages with the constructions described above.

According to the first aspect of the invention, only the driver's side hanger beam requiring a high rigidity is allowed to have the large diameter cross-section, while the front passenger's side hanger beam requiring no relatively high rigidity is allowed to have the small diameter cross-section by constituting the steering column hanger beam by the in-line connected body comprising the driver's side hanger beam and the front passenger's side hanger beam.

As a result of this, the weight of the steering column hanger beam can be reduced while securing the required rigidity for the steering column hanger beam.

In addition, the relatively wide space can be secured by constructing the front passenger's side hanger beam such that it has the small diameter cross-section. As a result of this, a required space for allowing an accessory to the vehicle body to be disposed can be secured relatively easily.

According to the second aspect of the invention, the respective constituent components of the driver's side hanger beam can be produced from the extruded profiles, whereby the respective constituent components can continuously be produced. As a result of this, the productivity of the steering column hanger beam can be improved to thereby suppress the costs involved.

According to the third aspect of the invention, the beam main body is formed so as to have the rectangular cross-section, and this allows the flanges and the support brackets to simply be attached to the normal positions on the beam main body by making use of the corner portions of the cross-section. As a result of this, since the driver's side hanger beam can be assembled for a relatively short period of time, the productivity of the steering column hanger beam can be improved to thereby suppress the costs involved.

What is claimed is:

1. A steering column hanger beam structure comprising:
a steering column; and
a steering column hanger beam extended between left and right front pillars, for supporting said steering column,
wherein said steering column hanger beam comprises a driver's side hanger beam having a first cross-sectional area and a front passenger's side hanger beam having a second cross-sectional area smaller than said first cross-sectional area;
wherein said front passenger's side hanger beam is offset to the rearward of a vehicle body from an axial center of the driver's side hanger beam;
wherein said driver's side hanger beam comprises a beam main body and a support bracket disposed on a side of said beam main body for supporting said steering column; and
wherein said beam main body and said support brackets are manufactured from extruded profiles.

2. The steering column hanger beam structure according to claim 1, wherein said driver's side hanger beam comprises:
a flange disposed at one end of said beam main body for abutment with one of said front pillars.

3. The steering column hanger beam structure according to claim 2, wherein said beam main body is a long member having a rectangular cross-section.

4. The steering column hanger beam structure according to claim 2, wherein said flange includes a peripheral wall and a rib which define a space receiving said beam main body.

5. The steering column hanger beam structure according to claim 1, wherein said driver's side hanger beam is formed by a member different from said front passenger's side hanger beam.

6. The steering column hanger beam structure according to claim 2, further comprising:
a connecting member including a plate, wherein a first surface of said plate is connected to a side surface of said driver's side hanger beam, supporting said support bracket, and a second surface of said plate opposing the first surface is connected to said front passenger's side hanger beam.

* * * * *